United States Patent
Fanini et al.

(10) Patent No.: US 11,480,706 B2
(45) Date of Patent: Oct. 25, 2022

(54) MULTIPLE CASING INSPECTION TOOL COMBINATION WITH 3D ARRAYS AND ADAPTIVE DUAL OPERATIONAL MODES

(71) Applicant: Baker Hughes Holdings LLC, Houston, TX (US)

(72) Inventors: Otto N. Fanini, Houston, TX (US); Babak Kouchmeshky, Kingwood, TX (US); Daniel Joseph Ratigan, Houston, TX (US); Mohamed Daoud, The Woodlands, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/171,141

(22) Filed: Oct. 25, 2018

(65) Prior Publication Data

US 2019/0129057 A1    May 2, 2019

Related U.S. Application Data

(60) Provisional application No. 62/579,117, filed on Oct. 30, 2017.

(51) Int. Cl.
*G01V 3/30* (2006.01)
*E21B 47/01* (2012.01)
(Continued)

(52) U.S. Cl.
CPC ............. *G01V 3/30* (2013.01); *E21B 47/01* (2013.01); *E21B 47/13* (2020.05); *G01V 3/28* (2013.01); *G01V 3/34* (2013.01); *G01V 3/38* (2013.01)

(58) Field of Classification Search
CPC .............. G01V 3/26; G01V 3/28; G01V 3/30; G01V 3/34; G01V 3/38; E12B 47/0905;
(Continued)

(56) References Cited

U.S. PATENT DOCUMENTS 5,331,278 A * 7/1994 Evanson ............... G01N 27/82
324/232
5,491,668 A   2/1996 Priest
(Continued)

FOREIGN PATENT DOCUMENTS

WO    2016/141110 A1    9/2016

OTHER PUBLICATIONS

D. Azuaje, Multiple Casing, Cement Evaluation Tools Enhance Well Integrity, E&P, http://www.epmag.com/multiple-casing-cement-evaluation-tools-enhance-well-tools-http://www.epmag.com/multiple-casing-cement-evaluation-tools-enhance-well-integrity-800926.
(Continued)

*Primary Examiner* — Thang X Le
(74) *Attorney, Agent, or Firm* — Hogan Lovells US LLP

(57) ABSTRACT

Methods, systems, devices, and products for taking multi-component induction tool measurements of a three-dimensional space from an interior of a plurality of nested tubulars in a borehole in an earth formation and estimating the property for each of the at least two tubulars using the multi-component induction tool measurements. The multi-component induction tool measurements may be responsive to a property corresponding to at least two conductive tubulars of the plurality of nested tubular. Taking multi-component induction tool measurements may include taking three-dimensional low-frequency sinusoidal frequency domain waveform resistivity measurements and taking three-dimensional transient EM measurements with the multi-component induction tool.

20 Claims, 10 Drawing Sheets

(51) Int. Cl.
*G01V 3/38* (2006.01)
*G01V 3/28* (2006.01)
*G01V 3/34* (2006.01)
*E21B 47/13* (2012.01)

(58) Field of Classification Search
CPC ......... E12B 47/01; E12B 47/122; G01B 7/10; G01B 7/312; G01N 27/82; E21B 47/0905; E21B 47/01; E21B 47/122
See application file for complete search history.

(56) References Cited

U.S. PATENT DOCUMENTS

| | | | |
|---|---|---|---|
| 5,512,830 A * | 4/1996 | Kuckes | E21B 47/00 324/346 |
| 5,999,883 A | 12/1999 | Gupta et al. | |
| 6,219,619 B1 | 4/2001 | Xiao et al. | |
| 6,466,872 B1 | 10/2002 | Kriegshauser et al. | |
| 6,618,676 B2 | 9/2003 | Kriegshauser et al. | |
| 6,643,589 B2 | 11/2003 | Zhang et al. | |
| 7,795,864 B2 | 9/2010 | Barolak et al. | |
| 8,456,166 B2 | 6/2013 | Depavia et al. | |
| 8,490,717 B2 * | 7/2013 | Bergstrom | G01V 3/26 175/40 |
| 8,638,103 B2 | 1/2014 | Rosthal et al. | |
| 8,755,248 B2 | 6/2014 | Wang | |
| 9,201,156 B2 | 12/2015 | Smithson | |
| 9,512,712 B2 | 12/2016 | Donderici et al. | |
| 2004/0249573 A1 * | 12/2004 | McElhinney | G01V 3/26 702/7 |
| 2007/0216416 A1 * | 9/2007 | Itskovich | G01V 3/28 324/339 |
| 2008/0211507 A1 * | 9/2008 | Zhdanov | G01V 3/28 324/333 |
| 2014/0035586 A1 * | 2/2014 | Rodney | G01V 3/081 324/326 |
| 2015/0002159 A1 * | 1/2015 | Ikegami | G01V 1/523 324/346 |
| 2015/0260669 A1 * | 9/2015 | Bittar | G01N 27/025 324/324 |
| 2015/0331134 A1 | 11/2015 | Haldorsen et al. | |
| 2015/0369951 A1 | 12/2015 | San et al. | |
| 2016/0018548 A1 | 1/2016 | McCafferty et al. | |
| 2016/0041287 A1 | 2/2016 | Merciu et al. | |
| 2016/0161627 A1 * | 6/2016 | Khalaj Amineh | E21B 47/0006 702/6 |
| 2016/0195635 A1 | 7/2016 | Sethi et al. | |
| 2017/0002642 A1 | 1/2017 | Zhao et al. | |
| 2017/0176629 A1 * | 6/2017 | Omeragic | G01V 3/28 |

OTHER PUBLICATIONS

H. G. Doll, "Introduction to Induction Logging and Application to Logging of Wells Drilled with Oil Based Mud, Journal of Petroleum Technology", vol. 1, p. 148, Society of Petroleum Engineers, Richardson Tex. (1949).

S. Mandayam et al., "Wavelet-based permeability compensation technique for characterizing magnetic flux leakage images, NDT&E International", vol. 30, No. 5, pp. 297-303, 1997.

PCT/US2018/057687—International Preliminary Report on Patentability dated Dec. 10, 2019.

* cited by examiner

MULTIPLE CASING INSPECTION TOOL COMBINATION WITH 3D ARRAYS AND ADAPTIVE DUAL OPERATIONAL MODES

CROSS-REFERENCE TO RELATED APPLICATIONS

This application claims priority from U.S. Provisional Application Ser. No. 62/579,117, filed Oct. 30, 2017, the entire disclosure of which is incorporated herein by reference in its entirety.

FIELD OF THE DISCLOSURE

This disclosure generally relates to borehole tools, and in particular to methods and apparatuses for conducting well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, monitoring and controlling the tool itself, and so on.

Systems having multi-component induction instruments as part of an after-drilling wireline logging system for measuring electrical properties of subsurface formations and determining the location of formation bed boundaries around the wireline logging system are known. Tools for magnetic inspection of pipe casing are also known.

SUMMARY OF THE DISCLOSURE

In aspects, the present disclosure is related to methods and apparatuses for well logging. Methods include taking multi-component induction tool measurements of a three-dimensional space from an interior of a plurality of nested tubulars in a borehole in an earth formation, and estimating the property for each of the at least two tubulars using the multi-component induction tool measurements. The multi-component induction tool measurements may be responsive to a property corresponding to at least two conductive tubulars of the plurality of nested tubulars. Taking multi-component induction tool measurements may include taking low-frequency sinusoidal frequency domain waveform resistivity measurements; and taking transient EM measurements with the multi-component induction tool. These measurements may be three-dimensional.

The property corresponding to each conductive tubular may comprise at least one of: i) location of the tubular; ii) thickness of the tubular; and iii) at least one property of a defect of the tubular; iv) a presence of a completion component inside at least one tubular; v) a property of a completion component outside at least one tubular; vi) tubular ovality of the at least one tubular; vii) deformation of the at least one tubular; viii) corrosion of the at least one tubular; ix) perforation of the at least one tubular; x) a presence of a completion component outside of the at least one tubular; xi) eccentricity of the at least one tubular with respect to another component, xii) a material property of the at least one tubular; viii) a material property of a material surrounding the at least one tubular. Taking three-dimensional transient EM measurements with the multi-component induction tool may include generating an electromagnetic (EM) field using an EM transmitter of the three multi-component induction tool to produce interactions between the electromagnetic field and the plurality of nested conductive tubulars; obtaining EM measurements indicative of the interactions. Estimating the property for each of the at least two tubulars may include performing an inversion of the EM measurements using a forward model generated with the property corresponding to each conductive tubular.

Methods may include magnetizing at least a portion of a first tubular of the plurality of tubulars to generate a spatially varying magnetic field having a magnetic field distribution responsive to abnormalities in the tubular; taking magnetostatic measurements responsive to the magnetic field distribution from a magnetic sensor array proximate an interior surface of the first tubular to generate magnetic measurement information. The magnetic sensor array may comprise a plurality of magnetic sensors distributed in at least two dimensions over a face of a pad. At least one sensor of the magnetic sensor array may comprise a three-dimensional magnetic sensor.

Methods may include estimating the property by using the multi-component induction tool measurements and the magnetic measurement information to resolve a structural feature relating to at least one tubular of the plurality of nested conductive tubulars exterior to the innermost tubular of the plurality of nested conductive tubulars.

The structural feature may comprise at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; viii) a material property of a material surrounding the at least one tubular.

Methods may include taking the magnetic measurements and the multi-component induction tool measurements at a plurality of decentralized positions with respect to at least one tubular of the plurality of nested conductive tubulars. The tubular may be magnetically non-saturated, and methods may include characterizing regions of each tubular of the plurality as one of: linear non-saturated, partially saturated, and fully saturated; and using forward models incorporating a B-H transfer curve in an inversion process.

Methods may include performing a joint inversion using the multi-component induction tool measurements and the magnetic measurement information to resolve a structural feature relating to at least one tubular of the plurality of nested conductive tubulars exterior to the innermost tubular of the plurality of nested conductive tubular.

Magnetizing the first tubular may saturate the tubular and a surrounding volume with a static field. Taking multi-component induction tool measurements may comprise superimposing at least one of i) three-dimensional low-frequency sinusoidal frequency domain waveform resistivity measurements, and ii) three-dimensional transient EM measurements, on the saturating static field to improve signal to noise ratio.

A nonconductive housing of the induction tool may separate a transmitter and receiver of the multi-component induction tool from the borehole. The multi-component induction tool may comprise an exterior housing, a non-conductive chassis interior to the housing, and measurement circuitry mounted on the non-conductive chassis such that the non-conductive chassis electrically isolates the measurement circuitry from other components of the induction tool. The carrier may comprise at least one of: i) a drill string; ii) coiled tubing; iii) a wireline; iv) slickline; and v) conveyed pipe. The conductive nested tubulars may be substantially metallic.

Methods may include conducting further operations in the formation in dependence upon the property. The further operations may comprise at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

Methods may include performing a joint inversion using the multi-component induction tool measurements and measurement information from at least one other non-electromagnetic sensor to resolve a structural feature relating to at least one tubular of the plurality of nested conductive tubulars. Taking three-dimensional low-frequency sinusoidal frequency domain waveform resistivity measurements may include using a multi-frequency measurement.

Methods as described above implicitly utilize at least one processor. Some embodiments include a non-transitory computer-readable medium product accessible to the processor and having instructions thereon that, when executed, causes the at least one processor to perform methods described above. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
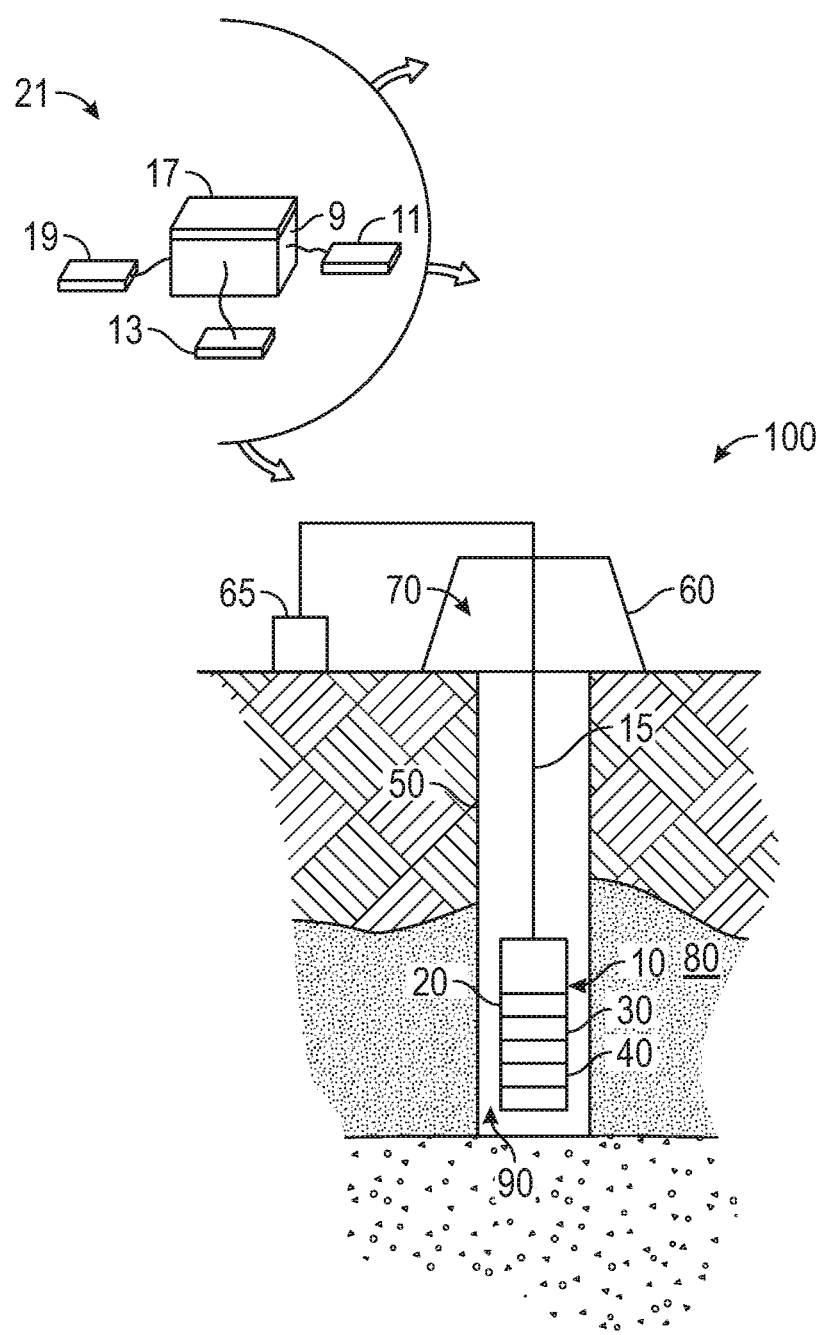
FIG. 1 schematically illustrates a wellbore logging system having a downhole tool configured to acquire multi-component induction tool measurements with a multicomponent induction tool.

Aspects of the present disclosure relate to apparatus and methods for evaluation of multiple casing strings, including measurement and interpretation of physical phenomena indicative of parameters of interest of the casing, other infrastructure components installed adjacent the casing or between two pipe casings (e.g., umbilicals, control lines, sensors, etc.), cement or other joining or support materials used for casing installation, or combinations of the same. General embodiments use three-dimensional multi-component induction tool measurements in a metallic environment to assess multiple nested casing strings. The term "multi-component" is intended to include all arrangements in which the transmitter and receiver coils are oriented in different directions sufficient to survey a three dimensional space so as to provide representative information; that is, a survey comprising information greater than that sufficient for a two-dimensional survey.

Inspection of underground tubulars is well known. Vast subterranean networks of installed tubular may suffer from defects at particular, but unpredictable, points. Detection of these defects is highly desirable. One prominent application is the detection of corrosion defects in downhole casing and tubing strings. Logging such strings is often the best (sometimes only) means of detecting these defects.

Known EM corrosion-monitoring tools typically rely on the physical phenomena of flux leakage and/or electromagnetic induction. A flux leakage tool may magnetize the pipe to be inspected until substantially saturated. Near a point of defect (e.g., a pit, hole, or corroded area) on either the interior or exterior of the tubular, a portion of the magnetic flux leaks out of the tubular and is detected by coils on the tool's sensors. Since the magnet must be as close as possible to the tubular, tubing must be removed in order to inspect casing. Moreover, detection of slowly varying corrosion with a flux leakage tool may be problematic.

Techniques described herein are particularly suited to casing integrity inspection by taking multi-component induction tool measurements of a three-dimensional space from an interior of a plurality of nested tubulars in a borehole in an earth formation, particularly where the multicomponent induction tool measurements are responsive to a property corresponding to at least two tubulars of the plurality of nested conductive tubulars, and estimating the property for each of the at least two tubulars using the multi-component induction tool measurements.

More particularly, taking multi-component induction tool measurements may include taking three-dimensional low-frequency sinusoidal frequency domain waveform resistivity measurements and taking three-dimensional transient EM measurements. The low frequency measurements may include adaptive multiple frequency adjustment. Low frequency sinusoidal sounding may be focused on smaller outer diameters and three-dimensional transient EM measurements may target the larger outer diameter casing. This dual-mode operation may improve radial evaluation capability and precision.

The three-dimensional space scanned by the multi-component induction tool comprises a volume which includes a plurality of nested conductive tubulars, such as for example, production tubing. The phenomena of induced currents interacting with the tubulars and the interpretation of measurements responsive to the tubular to determine tubular properties is one aspect which differentiates the present disclosure from conventional multi-component techniques wherein eddy currents are induced in earth formations from the magnetic field generated by the transmitter coil, and voltages are then induced in the receiver coils related to the magnitude of the eddy currents. Methods may comprise estimating a property corresponding to one or more tubulars of the plurality of nested conductive tubulars. The property corresponding to each conductive tubular may include at least one of: i) location of the tubular; ii) thickness of the tubular; and iii) at least one property of a defect of the tubular; iv) a presence of a completion component outside at least one tubular; and v) a property of a completion component outside at least one tubular.

Multi-component induction tool measurement information may be leveraged with traditional magnetic sensor information. This combination of features allows for multilayer casing structure determination, including multiple layer inner diameter (ID) and outer diameter (OD) estimation, as well as azimuthal sensitivity for multiple casing loss of metal, defects, and pits, casing and completion installation features, multiple casing decentralization, asymmetrical production tubings, precise detection of non-symmetric installation and associated features.

The unique set of advantages provided support employment of the techniques described herein in several downhole applications. For example, particular embodiments may allow azimuthal sounding to guide perforation in order to avoid damage to umbilicals, control lines outside casing, and so on, or to guide casing mechanical cutting (or other cutting) of the well installation in order to reach or avoid certain well installation and construction features.

Methods may include estimating a parameter of interest, such as a property for each of the at least two tubulars, from the information (e.g., the multi-component induction tool measurements), and/or performing further operations in dependence upon the parameters. Further operations may comprise at least one of: i) repairing borehole infrastructure; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) producing one or more hydrocarbons from the formation. In particular embodiments, a state of drilling operations, characteristics of the borehole or formation, or orientation of components of the downhole tool may be estimated using the parameter of interest, and then used in performing an operation as described above.

FIG. 1 schematically illustrates a wellbore logging system 100 having a downhole tool 10 configured to acquire multicomponent induction tool measurements with a multicomponent induction tool 40. This measurement information may be used to estimate properties of individual casing components of a multiple casing string—that is, a plurality of nested tubulars—or relationships between them. Additional sensors 45 may be used to take magnetic measurements in the borehole.

The physical principles of electromagnetic induction well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference.

In recent years, increasing use has been made of multi-component resistivity measurements that are responsive to vertical and horizontal resistivities (or, equivalently, conductivities) of anisotropic formations. The terms "horizontal" and "vertical" as commonly used and as used in this document relate to directions that are parallel to and perpendicular to bedding, and the resistivities in these directions are commonly the minimum and maximum in an anisotropic formation.

U.S. Pat. No. 5,999,883 issued to Gupta et al, the contents of which are fully incorporated here by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

U.S. Pat. No. 6,466,872 to Kriegshauser et al. having the same assignee as the present application and the contents of which are fully incorporated herein by reference discloses use of a multi-component logging tool (the 3DEX™ tool of of Baker Hughes, a GE company). See also, U.S. Pat. No. 6,618,676 to Kriegshauser et al., and in U.S. Pat. No. 6,643,589 to Zhang et al., having the same assignee as the present application and the contents of which are fully incorporated herein by reference.

The 3DEX™ tool has a depth of investigation in the formation that is typically several meters. The 3DEX measurements are sensitive to the orientation of the formation conductivity tensor. There are different depths of investigation (DOI) and different vertical resolutions for the 3DEX™ measurement and conventional borehole imaging logs. The borehole imaging tools usually have DOIs of a few centimeters, whereas the 3DEX™ measurement reads meters into the formation. Such a multicomponent logging tool has azimuthal sensitivity.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid (mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. The carrier 15 may include embedded conductors for power and/or data for providing signal and/or power communication between the surface and downhole equipment (e.g., a seven conductor cable).

A surface control system 65 receives signals from instrument 40 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the instrument 40, and may control one or more downhole operations performed by system 100.

In one embodiment, electronics 30 associated with instrument 40 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits (ASICs'), other combinatorial or sequential logic hardware, and so on.

In one embodiment, electronics may be configured to take measurements three dimensionally as the tool moves along the longitudinal axis of the borehole ('axially') using instrument 40. These measurements may be substantially continuous, which may be defined as being repeated at very small increments of depth and azimuth, such that the resulting information has sufficient scope and resolution to provide an image of tubular properties (e.g., electrical properties of the formation at the borehole).

In other embodiments, all or a portion of the electronics may be located elsewhere (e.g., at the surface, or remotely). To perform the treatments during a single trip, the tool may use a high bandwidth transmission to transmit the information acquired by sensors 40 and 45 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

One point of novelty of the system illustrated in FIG. 1 is that the at least one processor may be configured to perform certain methods (discussed below) that are not in the prior art. A surface control system or downhole control system may be configured to control the tool described above and any incorporated sensors and to estimate a parameter of interest according to methods described herein.

Figure 2A:
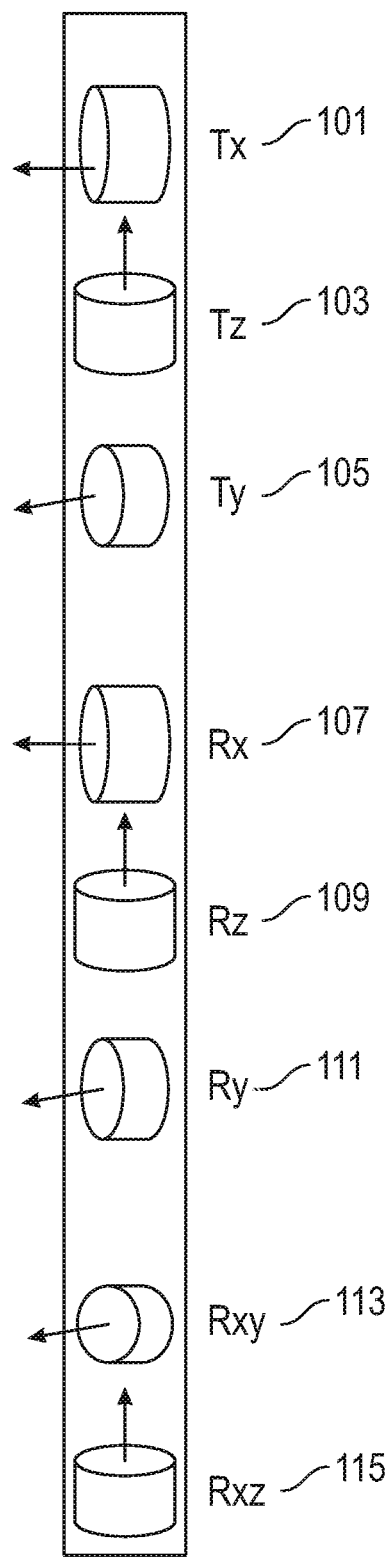
FIG. 2A illustrates a configuration of transmitter and receiver coils in multicomponent induction logging instruments in accordance with some embodiments of the disclosure.

FIG. 2A illustrates a configuration of transmitter and receiver coils in multicomponent induction logging instruments in accordance with some embodiments of the disclosure. Three orthogonal transmitters 101, 103 and 105 that are referred to as the Tx, Tz, and Ty transmitters are shown (the z-axis is the longitudinal axis of the tool). Corresponding to the transmitters 101, 103 and 105 are associated receivers 107, 109 and 111, referred to as the Rx, Rz, and Ry receivers, for measuring the corresponding magnetic fields Hxx, Hzz, and Hyy. In addition, the receivers 113 and 115 measure two cross-components Hxy, and Hxz of the magnetic field produced by the x-component transmitter. Although FIG. 2A illustrates orthogonal transmitters and receivers, it should be noted that various techniques are known for performing multi-component measurements at different orthogonal and non-orthogonal orientations, and any combination of any number of transmitter and receiver orientations which result in three dimensional measurements and/or measurements generating information greater than that sufficient for a two-dimensional survey are suitable for employment in the techniques of the present disclosure.

Figure 2B:
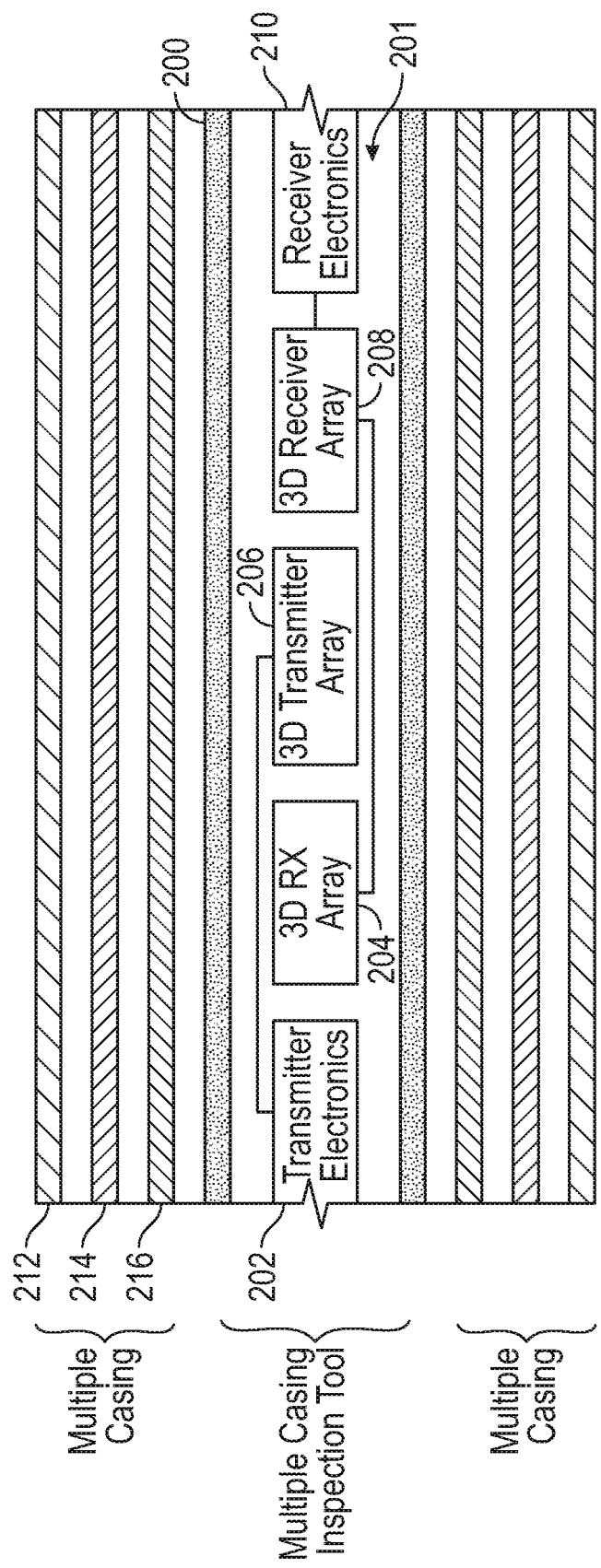
FIG. 2B illustrates multicomponent induction logging instruments in an operational environment in accordance with embodiments of the disclosure.

FIG. 2B illustrates multicomponent induction logging instruments in an operational environment in accordance with embodiments of the disclosure. Tool 200 comprises an instrument, Multiple Casing Inspection Tool ('MCIT') 201, which includes a multi-component transmitter array 206 with receiver arrays 204, 208 located above and below transmitter array 206 on the tool. Tool 201 may include a nonconductive housing separating transmitters and receivers of the multi-component induction tool from the borehole. As shown here, the tool may be implemented with the tool transmitters and receivers structurally combined and collocated. Shared elements may exist in both types of surveys, and surveys may be performed simultaneously and with repetition rates for stacking.

In one example, repetition may be synchronized with multiple frequency low frequency measurement and digitization of data. Synchronization of frequency may be carried out between alternating current (AC) and transient measurements. Transient and low-frequency AC may be simultaneously generated, and window filtered to separate the signals. The AC signal may include multiple frequencies, including frequency sweeps and multiple-frequency focusing. For example in dual frequency focusing, one relatively higher frequency reads more shallowly, while the relatively lower frequency deeper. In this way, signal differentiation produces depth location information. The transmitter array 206 is controlled by transmitter electronics 202. The receiver arrays 204, 208 are controlled by (and send information to) receiver electronics 210. Tool 200 is located at the center of multiple nested tubulars 212, 214, 216 (e.g, steel casing). The annular area between radially adjacent tubulars may be filled with cement, proppant, air, fluid, or other material. In some instances, a non-conductive tubular (not shown) may be installed interior to tubular 216 supporting a lower pressure differential.

Figure 2C:
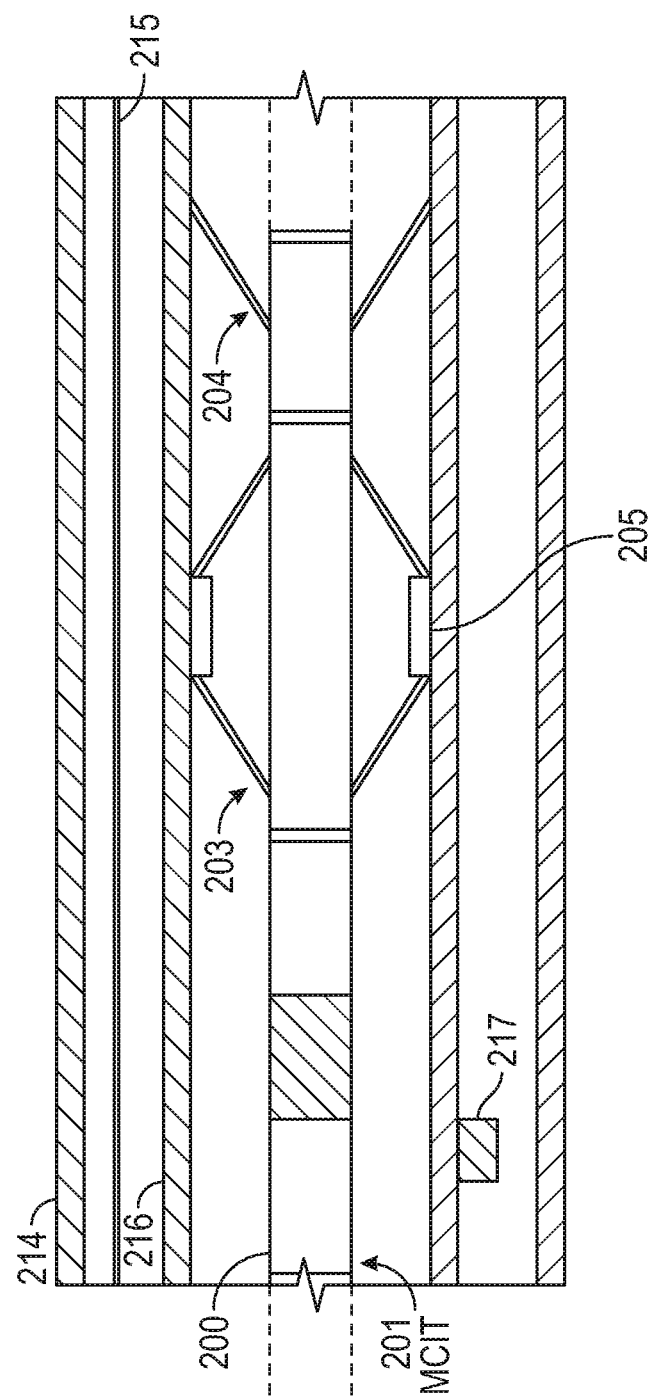
FIG. 2C illustrates another tool including logging instruments in an operational environment in accordance with embodiments of the disclosure.

FIG. 2C illustrates another tool including logging instruments in an operational environment in accordance with embodiments of the disclosure. Tool 200 is located centrally to multiple nested tubulars 214 and 216. Infrastructure components 215 and 217 are located in borehole 50. Operative cabling 215 is located in the annular volume between tubular 214 and tubular 216. Operative cabling may comprise umbilical cabling, control cables, and the like. Sensor 217 is installed adjacent the casing 216 between two pipe casings (e.g., umbilicals, control lines, sensors, etc.). Tool 200 may include MCIT 201, as well as the HRVRT™ tool of Baker Hughes, a GE company, a high-resolution vertilog service tool 203, and multi-fingered caliper 204. The HRVRT™ tool 203 includes a two-dimensional ('2D') array 205 of 3D sensors on a pad. In other embodiments, additional outer tubulars (e.g., tubular 212) or tubulars interior to 216 may be present.

Alternatively, tool 200 may include the DMAG™ tool provided by Baker Hughes, a GE company, LLC. The DMAG tool is an alternate current (AC) frequency domain induction cased-hole electromagnetic tool operating an array of multi-spaced transmitter and receiver coils performing multi-frequency measurements, described in further detail below in FIG. 3B. The DMAG may be utilized for casing inspection services to detect wall thickness and wall thickness changes in single or multiple casing strings, or to locate casing anomalies (e.g., holes, defects, and variations in surface features of casing's inner or outer surfaces).

Tool 203 may be configured for Hall effect based magnetic measurements of the innermost tubular. In one example, permanent magnet sensors detect magnetic flux leakage using techniques well known in the art. Magnetic induction sensors with ferrite inclusions may be used. Magnetic focusing may also be employed to enhance and increase directional sensitivity of multiple casing survey measurements.

By combining HRVRT measurement with the three-dimensional multi-component measurement, some advantages are achieved. A DC field-based magneto-static measurement may be carried out by generating of the static magnetic field, either by a permanent magnet or an electro-magnet (e.g., temporarily induced and reversed by an external excitation), and conducting magnetic flux leakage measurements to detect internal and external metal loss and punctured casing using conventional techniques. The first (innermost) casing may or may not be magnetically saturated, per B-H operating curve response.

However, if one or two metallic casings are saturated by a strong DC magnetic field, the phenomenon magnetically clears the surrounding spatial volume ('path') to perform a survey of the outer (higher diameter) casings with transient or frequency domain magnetic survey measurement signals superimposed on the saturating DC field. This allows a measurement with better signal-to-noise ratio of the outer casing's signal response measurement.

If regions of the tubulars are non-saturated, each casing region may be characterized (e.g., linear non-saturated, partially saturated, and fully saturated operating regions) using a priori or updated infrastructure data based on measurement interpretation geometry, material properties, and the like. The characterizations of each region may be incorporated into the interpretation method using an inversion process and corresponding supporting forward models describing the multiple casings' structure and surrounding media.

At least one tubular being surveyed may be less than substantially conductive (e.g., non-conductive or less conductive). For example, non-conductive casing could be present for low pressure differential across its inner and outer surfaces. Despite being non-magnetic, effects of a non-conductive casing may be accounted for in the overall survey function, such as, for example, by providing geometry information associated with any permanently mounted completion or production related installation elements. Segregated currents induced in the fluid media and flowing in (but not between) annular volumes also affect electromagnetic behavior of the volumes and may be accounted for.

Techniques described herein are subject to application in various different embodiments. In some general embodiments, carrier 15 is implemented as a tool string of a drilling system, and the acoustic wellbore logging may be characterized as "logging-while-drilling" (LWD) or "measurement-while-drilling" (MWD) operations.

General method embodiments include performing an inversion of casing survey data of multiple downhole casing liners and completion installation components based on collocated three-dimensional low-frequency sinusoidal frequency domain waveform resistivity measurements and three-dimensional transient EM measurements taken with a multi-component induction tool. That is, a geometric structural description of casing multiple liners and borehole (ID & OD of each casing liner; eccentricity of each liner; shape of each liner; defects; etc.) may be derived from the combination of EM measurement information responsive to one or more pipe casings. Although the example of casing as the tubular is used throughout, the application of the techniques described herein is not so limited.

This geometrical structural description may then be used to interpret data from other measurements performed in the same surrounding media volume and depth location, and relating to the same casing structures. Joint evaluation may include one dimensional (1D), two dimensional (2D) or three dimensional (3D) imaging processing and/or forward-model based inversion, and so on, and may be complemented with information from other logging auxiliary measurements, such as, for example, for the generation of boundary conditions.

In one example, interpretation is carried out beginning with the innermost tubular and working outward. An interpretation sequence may include interpretation of survey measurements of a first (nearest) tubular based on magnetic flux measurements. These magnetic flux measurements may be conducted with pad-based sensors (such as sensors 372) or other sensors near or in close contact with the first tubular's inner surface. The first tubular survey data interpretation may be employed to assist in the survey of the second closest tubular, and so on with other tubulars behind them. For example, results of inversions of survey data for the first tubular may provide casing thickness, inner diameter, and/or outer diameter. These may be employed to assist in the survey of the tubular having the next smallest diameter (e.g., radially the second closest) as the next adjacent structural member with unknown geometry sizes, and so on with other sequentially larger tubulars beyond this particular casing being evaluated at this stage. Subsequently, the inversion and interpretation of the low frequency sinusoidal frequency domain measurements may be carried out for each subsequent tubular in order from the lower diameter to the largest diameter measurable by the frequency domain casing measurement technique, followed by inversion and interpretation of transient measurement data. As noted, transient measurement data is particularly useful for resolving diameters and thicknesses of the outer casings having the largest inner diameters (ID) and outer diameters (OD).

In some casing inspection and/or well integrity operations, the original dimensions and geometric details of the multiple casing installation are known. Using this a priori information both frequency-domain and time-domain transient responses based on a forward model can be utilized to perform calculation of the expected measurements, such as, for example, employing a three-dimensional transmitter receiver coupling surveying the multiple casing structure. A full calibration and full characterization may be applied to raw measurement data obtained from the MCIT before inversion and interpretation processing, so that its actual measured response data matches the synthetic responses calculated by the corresponding forward model.

Data processing routines may extract data features and content from the full waveform data produced from measurements of the multiple casing cylindrical structures. These data features may be used to focus on the targeted volume regions associated with a casing or group of casings being evaluated in order to extract desired casing geometric dimensions and casing's material properties from the measured waveforms using known inversion and interpretation techniques. For the structure being evaluated, the corresponding signal portion of the total corresponding signal measured may be compared with the predicted signal calculated by the forward model associated with the structure, and the inverted model may be adjusted until the measured and predicted signals match.

As the inner structures are progressively evaluated towards the outer structures and their corresponding geometries and material properties are determined, the portion of the total waveform frequency-domain or time-domain signals of the previously evaluated structures may be removed, leaving the remaining background signals containing survey information associated with the outer structure, which have not yet been evaluated or removed from the remaining background signal. Frequency domain waveforms and data can be spatially selectively focused on the concentric cylindrical structures described by a priori information with multiple component, multiple spacing, and multiple frequency measurements using geometric factors and corresponding filters. See, for example, U.S. Pat. No. 6,219,619 to Xiao et al., incorporated herein by reference in its entirety. Time domain waveforms and data may be spatially selectively focused on concentric cylindrical structures with convolution algorithms utilizing functions associated with the concentric cylindrical structures described by a priori information with multiple component and multiple spacing measurement data. The inversion problems may be solved iteratively, for example, with a constrained regularized Gauss-Newton minimization scheme. A dual grid approach may be implemented to minimize computation time to near real-time, wherein the Jacobian matrix is computed using a very coarse optimal grid. The multiplicative regularization technique, which automatically determines the regularization parameter, may be employed to regularize the inversion process.

Figure 3A:
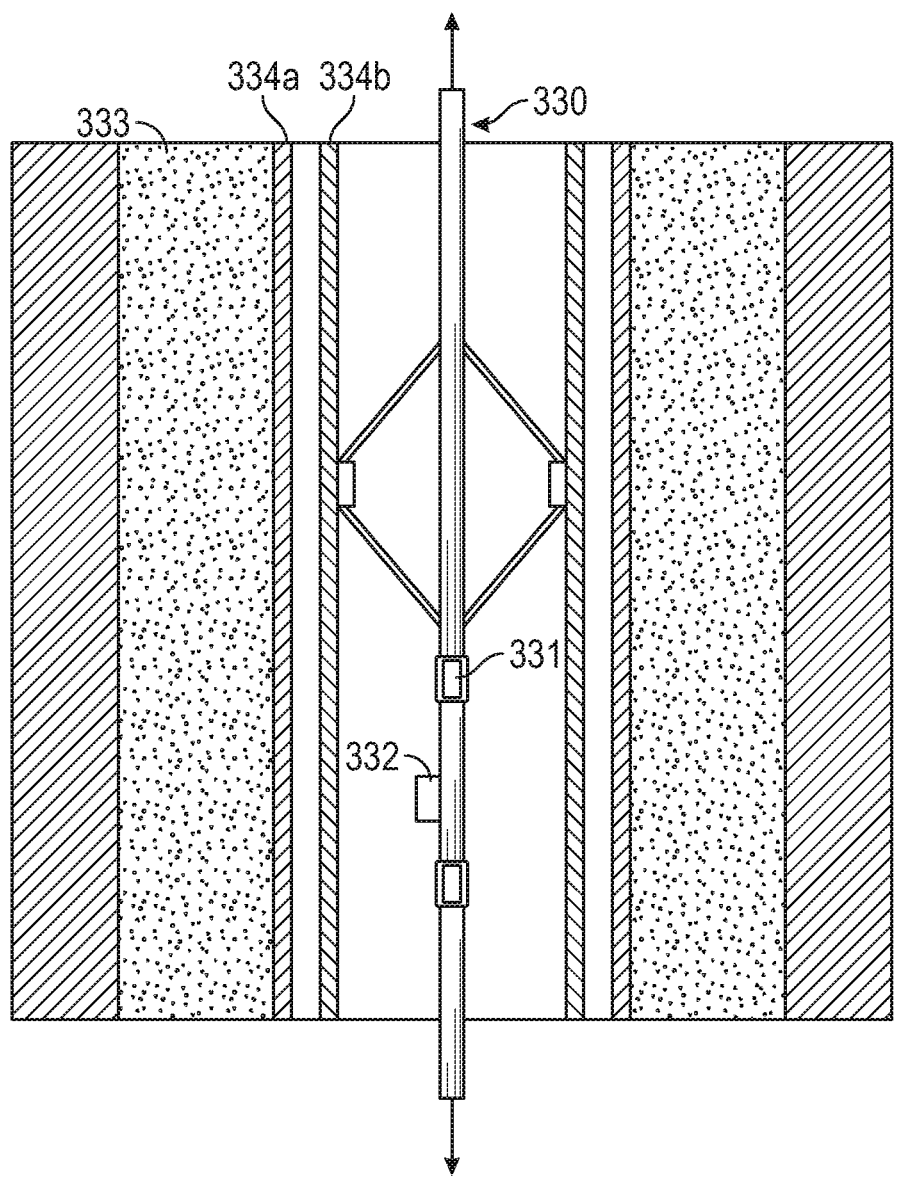
FIG. 3A illustrates a logging tool in accordance with embodiments of the present disclosure.

FIG. 3A illustrates a logging tool in accordance with embodiments of the present disclosure. The tool 330 may be connected with further downhole tools, above and/or below tool 330, such as perforation tools, stimulation tools, milling tools, rollers and so on, as part of a tool string. The tool 330 may be configured for conveyance in nested casing tubular 334a and 334b and configured to detect infrastructure features 333 exterior to the casing 334a and 334b. The tool 330 includes an acoustic beam transducer assembly 332 rotated by a motor section 331. A transient or multi-frequency EM 3D tool array 335 may reside between centralizer arms 336. The centralizer arms may urge a sensor array pad 337 against the inner wall of the innermost casing tubular. The sensor array pad 337 may include a magnetic flux detector, as described in further detail below.

Figure 3B:
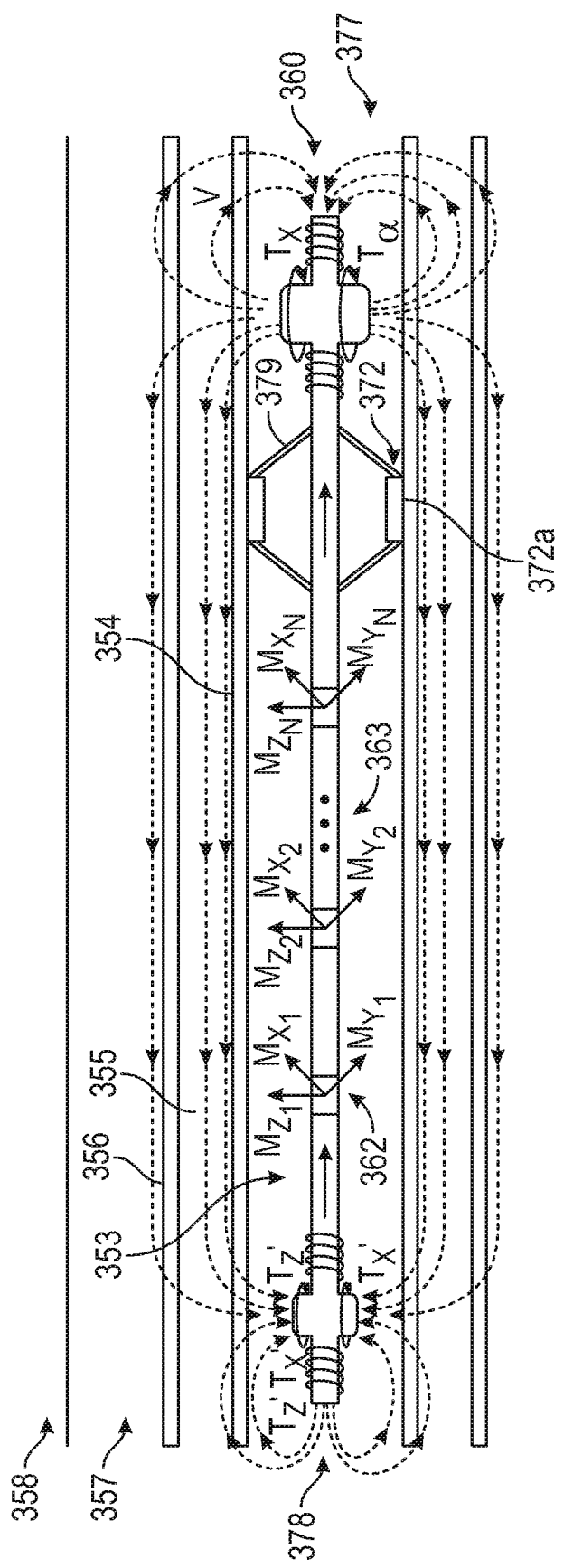
FIG. 3B illustrates another logging tool in accordance with embodiments of the present disclosure.

FIG. 3B illustrates another logging tool in accordance with embodiments of the present disclosure. The tool 363 is conveyed in a cased borehole. The annulus 353 between the tool and the casing 354 is filled with downhole fluid. The casing 356 is joined with the formation 358 by cement 357 in a borehole intersecting the formation 358. The casing 354 is interior to casing 356. Annular volume 357 between casing 354 and casing 356 may be filled by air, downhole fluid, cement, or other joining or support materials used for casing installation.

The tool includes a tool array 377. At each end of the array 377 are an upper tri-axial transmitter 378 and a lower tri-axial transmitter 360. Each tri-axial transmitter comprises three orthogonal transmitters referred to as the Tx, Tz, and Ty (or Tx', Ty', and Tz', respectively). The z-axis is the longitudinal axis of the tool. A plurality of 3D focused tri-axial coil receiver arrays 362 ($M_1 \ldots M_N$) may be positioned along the tool between the tri-axial transmitters. All coils are mounted in a tool structural member comprising a material configured to make the structural coil support the preferred path of magnetic flux inside the tubular as indicated by arrows in FIG. 3B. The individual component coil receivers (e.g., z-component) may be referred to as $Mz_1 \ldots Mz_N$. A pad-mounted sensor array 372 is mounted below the receiver arrays and above the lower tri-axial transmitter 360. The array 372 may include 3D tri-axial Micro-Electro-Mechanical Systems (MEMS) flux leakage sensors, magnetic field sensors, Hall effect sensors, and so on. The array 372 may be mounted on extendable and retractable pads 372a, which may be deployed next to casing using extending devices 379 or the like. The tool may be configured for measurements at multiple frequencies or time domain transient measurements.

Figure 3C:
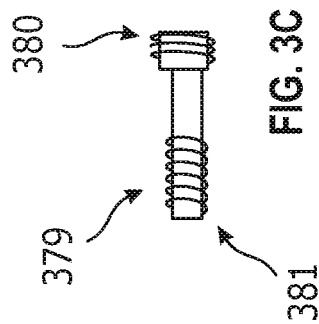
FIG. 3C illustrates a dual-coil assembly with embodiments of the present disclosure.

FIG. 3C shows a dual-coil assembly 381 implemented with a main coil 379 with magnetic moment $M_{man}$ and another coupled bucking coil 380 connected in series with magnetic moment $M_{Buck}$ with opposite polarity. The resulting magnetic moment of the receiver assembly 381 is $M_{Receiver}=M_{Main}-M_{Buck}$. The bucking coil's function may be to reduce or eliminate the effect from the direct magnetic field and flux received directly from the transmitter. Alternatively, the dual-coil assembly 381 may be employed as a a dual-coil transmitter assembly with resulting magnetic moment $M_{Transmitter}=M_{Main}-M_{Buck}$. In this case the bucking coil's function may be to reduce or eliminate the direct magnetic field and corresponding flux received at the receiver coils directly from the transmitter assembly coils. The bucking coil may be implemented with the same or different number of turns on both sides of the main coil, with the same or opposite polarities or with the same or different turn ratios with the respect to the number of turns of the main coil in order to achieve the desired tool spatial measurement response to surrounding casing structures and well installations In operation, the tool 363 may perform magnetic cased well surveys using frequency and spatially focused interpretation and inversion methods using a forward model generated based on knowledge of a specific cased well structure. The interpretation and inversion methods resolve geometry and material properties not defined with a priori knowledge. EM data obtained in accordance with the above embodiments may be used to generate the forward model. The 3D tri-axial upper transmitter 378 focuses surveying magnetic fluxes radially into the casing structure 354 to be circulated back through the 3D tri-axial lower transmitter 360. The sensors of sensor array 372 may be configured to sense magnetic flux leakages, current induced magnetic field, and other magnetic flux disturbances of the cased well structure and construction near the inner cased surface ID (e.g., Hall effects measurements performed with an HRVRT™ tool). Evaluation of the resulting measurements may be carried out in accordance with techniques known to those of skill in the art. See, for example, U.S. Pat. No. 7,403,000 to Barolak et al. and U.S. Pat. No. 7,795,864 to Barolak et al., each incorporated herein by reference in its entirety.

Figure 4A:
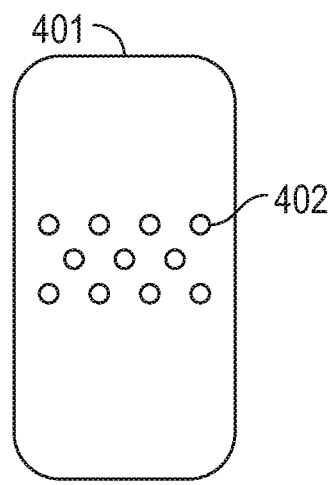
FIG. 4A illustrates a pad including sensors incorporated on its face.

FIG. 4A illustrates a pad 401 including sensors 402 incorporated on its face. Sensors 402 may all be electrical sensors, such as, for example, button electrodes configured to sense voltage, current, or both voltage and current. For example, sensors 402 may be resistivity sensors, forming a two-dimensional (2D) hybrid sensor array across the face of the pad. Pad 401 is merely illustrative and is not restricted to the array geometry arrangement shown.

Figure 4B:
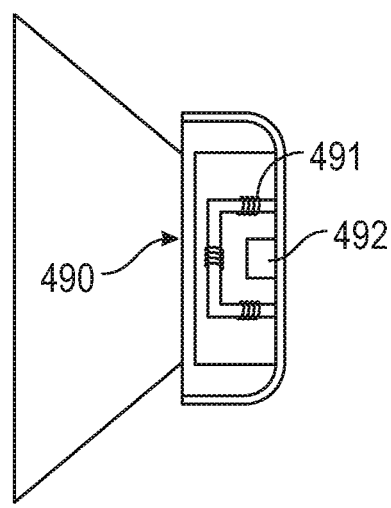
FIG. 4B shows a pad with coils radially and longitudinally oriented and mounted on a pad's internal structure shown in pad.

Pad measurements may be acquired with orientation data within the borehole provided by a calibrated directional package including 3D triaxial accelerometers and 3D triaxial magnetometers for example. FIG. 4B shows a pad 490 with coils 491 radially and longitudinally oriented and mounted on a pad's internal structure shown in pad 490 comprising a preferred path to guide the magnetic flux detected. Pad 490 contains in its internal structure a triaxial 3D EM MEMS sensor 492.

Aspects of the present disclosure are subject to application in various different embodiments. In some general embodiments, carrier 15 is implemented as a tool string of a drilling system, such as for example, through drill-pipe conveyed measurement as drill string is pulled back on a trip-out operational step reaching the cased hole section, or measurements taken in the borehole may be characterized as "logging-while-drilling" (LWD) or "measurement-while-drilling" (MWD) operations. The carrier may alternatively be implemented as coiled tubing or pipe (e.g., pipe conveyance).

Figure 5:
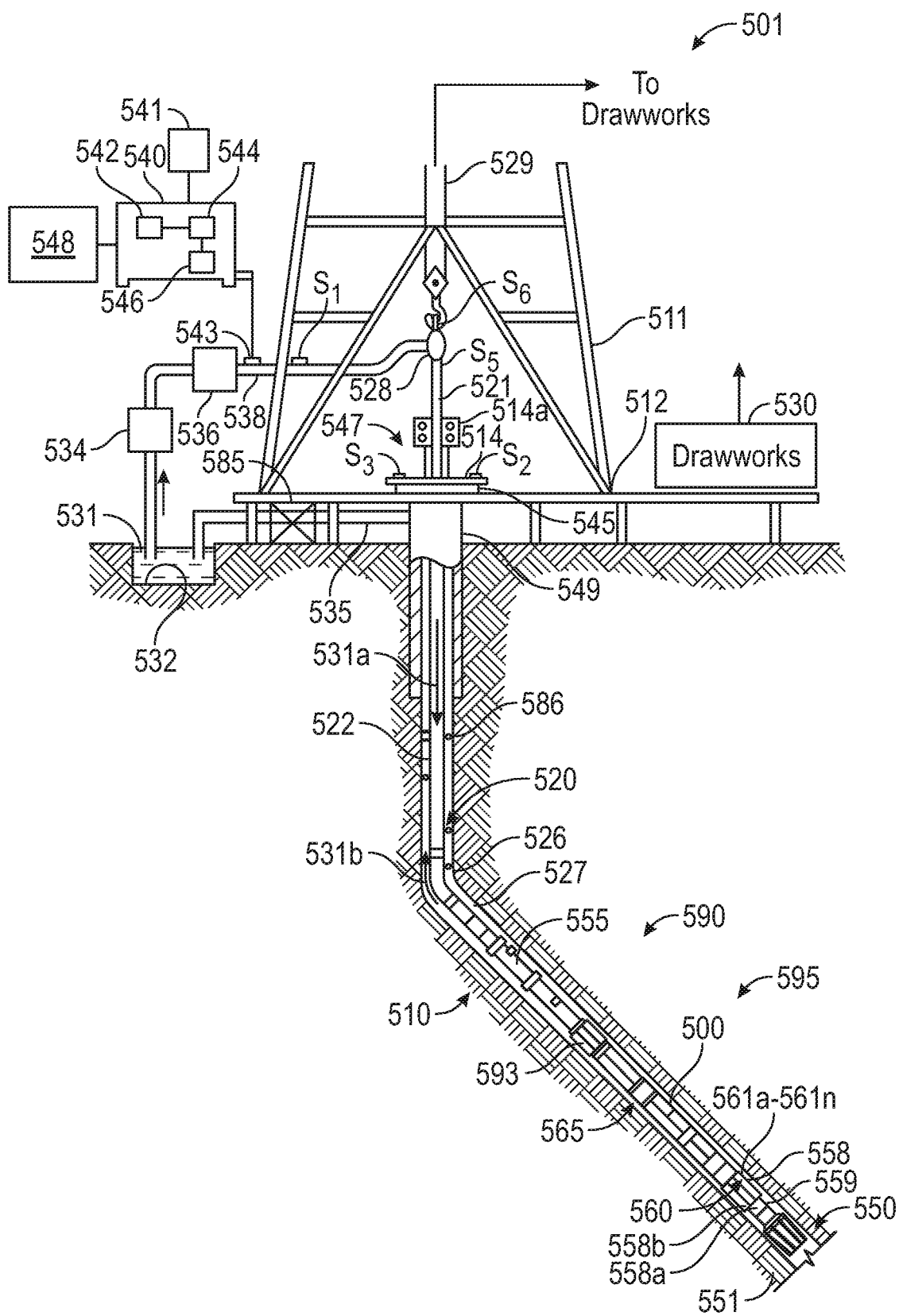
FIG. 5 is a schematic diagram of an exemplary drilling system according to one embodiment of the disclosure.

FIG. 5 is a schematic diagram of an exemplary drilling system 501 according to one embodiment of the disclosure. FIG. 5 shows a drill string 520 that includes a bottomhole assembly (BHA) 190 conveyed in a borehole 526. The drilling system 501 includes a conventional derrick 511 erected on a platform or floor 512 which supports a rotary table 514 that is rotated by a prime mover, such as an electric motor (not shown), at a desired rotational speed. A tubing (such as jointed drill pipe 522), having the drilling assembly 590, attached at its bottom end extends from the surface to the bottom 551 of the borehole 526. A drill bit 550, attached to drilling assembly 590, disintegrates the geological formations when it is rotated to drill the borehole 526. The drill string 520 is coupled to a drawworks 530 via a Kelly joint 521, swivel 528 and line 529 through a pulley. Drawworks 530 is operated to control the weight on bit ("WOB"). The drill string 520 may be rotated by a top drive (not shown) instead of by the prime mover and the rotary table 514. Alternatively, a coiled-tubing may be used as the tubing 522. A tubing injector 514a may be used to convey the coiled-tubing having the drilling assembly attached to its bottom end. The operations of the drawworks 530 and the tubing injector 514a are known in the art and are thus not described in detail herein.

A suitable drilling fluid 531 (also referred to as the "mud") from a source 532 thereof, such as a mud pit, is circulated under pressure through the drill string 520 by a mud pump 534. The drilling fluid 531 passes from the mud pump 534 into the drill string 520 via a desurger 536 and the fluid line 538. The drilling fluid 531a from the drilling tubular discharges at the borehole bottom 551 through openings in the drill bit 550. The returning drilling fluid 531b circulates uphole through the annular space 527 between the drill string 520 and the borehole 526 and returns to the mud pit 532 via a return line 535 and drill cutting screen 585 that removes the drill cuttings 586 from the returning drilling fluid 531b. A sensor S1 in line 538 provides information about the fluid flow rate. A surface torque sensor S2 and a sensor S3 associated with the drill string 520 respectively provide information about the torque and the rotational speed of the drill string 520. Tubing injection speed is determined from the sensor S5, while the sensor S6 provides the hook load of the drill string 520.

Well control system 547 is placed at the top end of the borehole 526. The well control system 547 includes a surface blow-out-preventer (BOP) stack 515 and a surface choke 549 in communication with a wellbore annulus 527. The surface choke 549 can control the flow of fluid out of the borehole 526 to provide a back pressure as needed to control the well.

In some applications, the drill bit 550 is rotated by only rotating the drill pipe 522. However, in many other applications, a downhole motor 555 (mud motor) disposed in the BHA 590 also rotates the drill bit 550. The rate of penetration (ROP) for a given BHA largely depends on the WOB or the thrust force on the drill bit 550 and its rotational speed.

A surface control unit or controller 540 receives signals from the downhole sensors and devices via a sensor 543 placed in the fluid line 538 and signals from sensors S1-S6 and other sensors used in the system 501 and processes such signals according to programmed instructions provided to the surface control unit 540. The surface control unit 540 displays desired drilling parameters and other information on a display/monitor 541 that is utilized by an operator to control the drilling operations. The surface control unit 540 may be a computer-based unit that may include a processor 542 (such as a microprocessor), a storage device 544, such as a solid-state memory, tape or hard disc, and one or more computer programs 546 in the storage device 544 that are accessible to the processor 542 for executing instructions contained in such programs. The surface control unit 540 may further communicate with a remote control unit 548. The surface control unit 540 may process data relating to the drilling operations, data from the sensors and devices on the surface, data received from downhole, and may control one or more operations of the downhole and surface devices. The data may be transmitted in analog or digital form.

The BHA 590 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 595 surrounding the BHA 590. Such sensors are generally known in the art and for convenience are generally denoted herein by numeral 565. The BHA 590 may further include a variety of other sensors and devices 559 for determining one or more properties of the BHA 590 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 559.

The BHA 590 may include a steering apparatus or tool 558 for steering the drill bit 550 along a desired drilling path. In one aspect, the steering apparatus may include a steering unit 560, having a number of force application members 561a-561n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 558 having a bent sub and a first steering device 558a to orient the bent sub in the wellbore and the second steering device 558b to maintain the bent sub along a selected drilling direction. The steering unit 558, 560 may include near-bit inclinometers and magnetometers.

The drilling system 501 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 590 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT and MULTI-SENSE, both downhole measurement systems manufactured by BAKER HUGHES, A GE COMPANY.

The drilling system 501 can include one or more downhole processors at a suitable location such as 593 on the BHA 590. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 542 can process the surface measured data, along with the data transmitted from the downhole processor, to evaluate formation lithology. While a drill string 520 is shown as a conveyance device for sensors 565, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 501 may include a bottomhole assembly and/or sensors and equipment for implementation of embodiments of the present disclosure on either a drill string or a wireline.

A point of novelty of the system illustrated in FIG. 5 is that the surface processor 542 and/or the downhole processor 593 are configured to perform certain methods (discussed below) that are not in the prior art. Surface processor 542 or downhole processor 593 may be configured to control mud pump 534, drawworks 530, rotary table 514, downhole motor 555, other components of the BHA 590, or other components of the drilling system. Surface processor 542 or downhole processor 593 may be configured to control sensors described above and to estimate a parameter of interest according to methods described herein.

Control of these components may be carried out using one or more models using methods described below. For example, surface processor 542 or downhole processor 593 may be configured to modify drilling operations i) autonomously upon triggering conditions, ii) in response to operator commands, or iii) combinations of these. Such modifications may include changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 542, downhole processor 593, or other processors (e.g. remote processors) may be configured to use at least one sensor to produce a corresponding signal. In some general embodiments, surface processor 542, downhole processor 593, or other processors (e.g. remote processors) may be configured to operate the tool 510 to excite and measure EM signals.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Instruments may be referenced to a directional package included in the tool string (e.g., assembled in the drill string as appropriate, such as, for example, just above drill bit). The directional package may include, but is not limited to, 3D triaxial accelerometers and magnetometers. This directional package may provide dip, azimuth and toolface information.

Magnetometers in a Measurement-While-Drilling (MWD) sensor unit (MWDU) may take measurements during drilling operations. The toolface and the inclination angle may be determined from the accelerometer measurements. The azimuth may be determined from the magnetometer measurements in conjunction with the tool face and inclination angle. As used herein, the term "toolface" means the orientation angle of the bent housing or sub in the borehole with respect to a reference such as high side of the borehole which indicates the direction in which the borehole will be curving. In case of drilling with a rotary steerable drilling tool, the term "toolface" means the orientation of a reference feature of the steering tool, e.g. one of the steering ribs on a non-rotating sleeve, with respect to another reference such as high side of the borehole, which is used to determine the desired distribution of steering forces for deflecting the borehole in a desired direction. The inclination angle is the angle between the borehole axis and the vertical (direction of the gravity field). The azimuth is the angle between the horizontal projection of the borehole axis and a reference direction such as magnetic north or absolute north.

Composite 3D images may be used to derive strike and dip with a corresponding inferred reservoir structural and layer description associated having lithological and geological characterization of the structure and composition of a reservoir. Multi-well horizon correlation, real-time geological drilling well placement guidance, and well path steering feedback corrections may also be conducted using the strike and dip data.

Figure 6A:
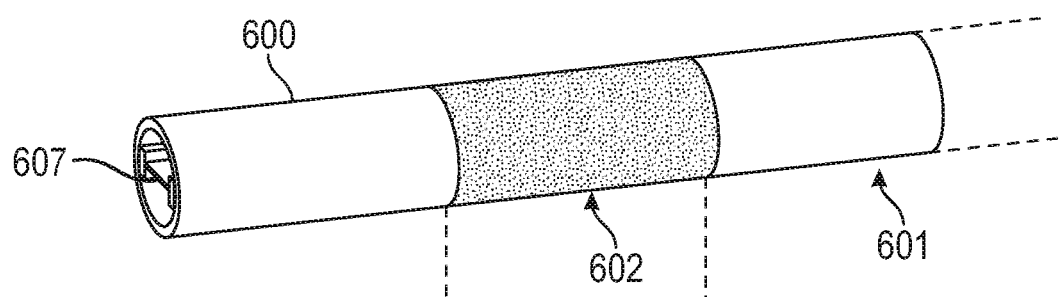
FIGS. 6A & 6B illustrate a tool section in accordance with embodiments of the present disclosure.
Figure 6B:
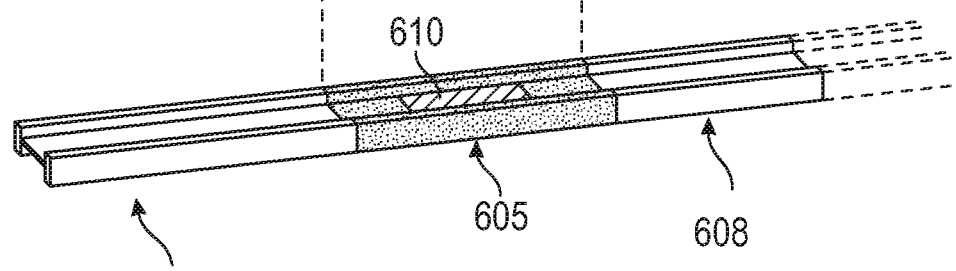

FIGS. 6A & 6B illustrate a tool section in accordance with embodiments of the present disclosure. FIG. 6B illustrates components interior to the housing. The multi-component induction tool 600 comprises an exterior housing 601 having a non-conductive segment 602. Alternatively, segment 602 may be substantially non-conductive. Exterior housing 601 may be a conveyance pressure housing with conductive sections coupled to and separated by a non-conductive section 602. The tool 600 also includes a non-conductive chassis 605 interior to the housing 601, and measurement circuitry 610 mounted on the non-conductive chassis such that the non-conductive chassis electrically isolates the measurement circuitry from other components of the induction tool. Transverse oriented coils induce electrical currents along the instrument longitudinal axis. Unwanted eddy currents that do not contain multiple casing or surrounding formation property sounding information and might interfere with desired signals detected and received from the surrounding structure and materials are thus mitigated. The novel aspects of tool 600 improve measurement quality, sensitivity to targeted surrounding structure properties and casing structural parameters, and relative desired signal strength versus unwanted signals.

Non-conductive chassis 605 may be an internal structural chassis functioning as a carrier for electrical components, such as, for example, transmitter and receiver coils, transmitters, receivers, interconnection harnesses and wiring, and other modules also implemented with conductive sections 607 and 608. In other embodiments, chassis 605 may be substantially non-conductive. The choice of conductive, non-conductive or reduced conductivity material properties for certain tool sections (cylindrical sections, rectangular slot openings, slot openings with a generalized shape, etc.) may function to remove or reduce the lossy interference of the tool-to-casing signal coupling effect or the parasitic eddy currents which otherwise would deteriorate the Multiple Casing Inspection tool measurement capabilities with a continuously conductive structure. If a segment of a component (e.g., housing, chassis, etc.) is at least partially composed of substantially non-conductive materials, and the portion of the materials comprising the segment and/or the portion of the segment length is sufficient in proportion to the whole to perform these functions, the component is defined as substantially non-conductive.

Figure 7:
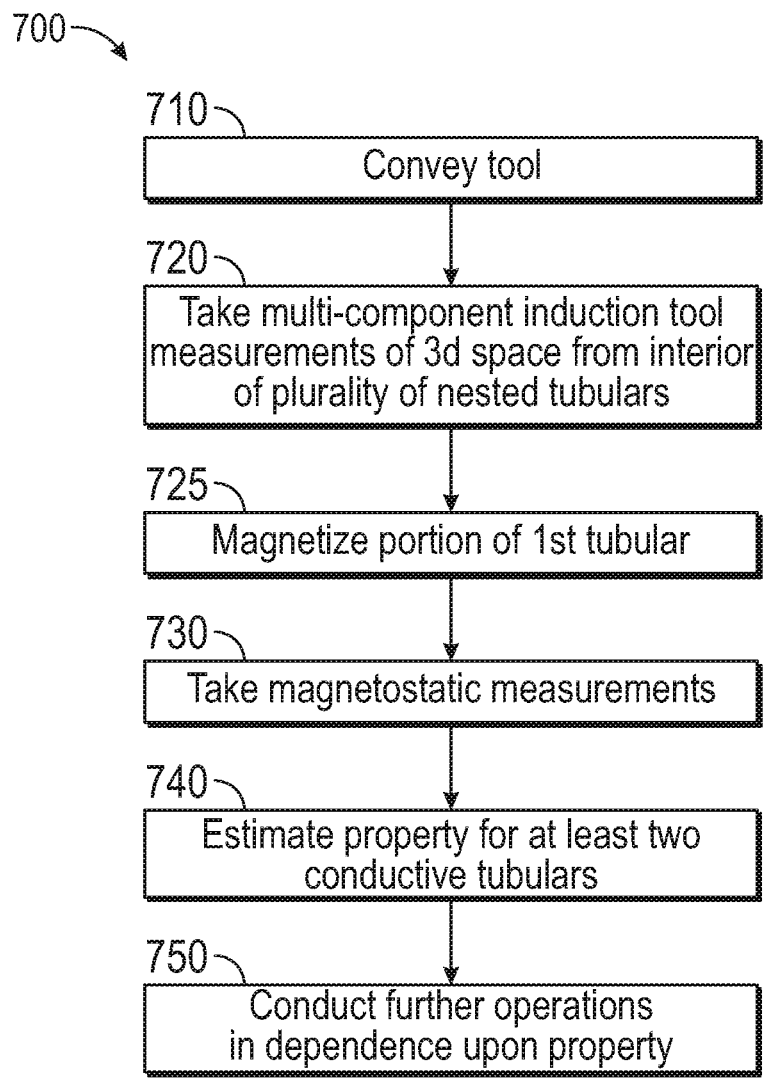
FIG. 7 illustrates methods in accordance with embodiments of the disclosure.

FIG. 7 illustrates methods 700 in accordance with embodiments of the disclosure. In optional step 710, a multi-component induction tool is conveyed in a borehole using a carrier. Step 720 comprises taking multi-component induction tool measurements of a three-dimensional space from an interior of a plurality of nested tubulars in a borehole in an earth formation. The multicomponent induction tool measurements may be responsive to a property corresponding to at least two conductive tubulars of the plurality of nested tubular. Taking multi-component induction tool measurements may include taking three-dimensional low-frequency sinusoidal frequency domain waveform resistivity measurements and taking three-dimensional transient EM measurements with the multi-component induction tool.

Taking three-dimensional transient EM measurements with the multi-component induction tool may include generating an electromagnetic (EM) field using an EM transmitter of the three multi-component induction tool to produce interactions between the electromagnetic field and the plurality of nested conductive tubulars and obtaining EM measurements indicative of the interactions.

Optional step 725 comprises magnetizing at least a portion of a first tubular of the plurality of tubulars to generate a spatially varying magnetic field having a magnetic field distribution responsive to abnormalities in the tubular. Optional step 730 comprises taking magnetostatic measurements responsive to the magnetic field distribution from a magnetic sensor array proximate an interior surface of the first tubular to generate magnetic measurement information. At least one sensor of the magnetic sensor array may be a three dimensional magnetic sensor. The magnetic sensor array may include a plurality of magnetic sensors distributed in at least two dimensions over a face of a pad. When the tubular is magnetically non-saturated, step 730 may include characterizing regions of each tubular of the plurality as one of: linear non-saturated, partially saturated, and fully saturated; and using forward models incorporating a B-H transfer curve in an inversion process.

When magnetizing the first tubular saturates the tubular and a surrounding volume with a static field, taking multi-component induction tool measurements may include superimposing at least one of i) three-dimensional low-frequency sinusoidal frequency domain waveform resistivity measurements, and ii) three-dimensional transient EM measurements, on the saturating static field to improve signal to noise ratio.

In some instances the magnetic measurements and the multi-component induction tool measurements are taken at a plurality of decentralized positions with respect to at least one tubular of the plurality of nested conductive tubulars.

Step 740 comprises estimating the property for each of the at least two tubulars using the multi-component induction tool measurements. Estimating the property for each of the at least two tubulars may be carried out by performing an inversion of the EM measurements using a forward model generated with the property corresponding to each conductive tubular.

Estimating the property may include using the multi-component induction tool measurements and the magnetic measurement information to resolve a structural feature relating to at least one tubular of the plurality of nested conductive tubulars exterior to the innermost tubular of the plurality of nested conductive tubulars. The structural feature may be at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; viii) a material property of a material surrounding the at least one tubular.

Estimating the property may include performing a joint inversion using the multi-component induction tool measurements and the magnetic measurement information to resolve a structural feature relating to at least one tubular of the plurality of nested conductive tubulars exterior to the innermost tubular of the plurality of nested conductive tubular.

Estimating the property may include performing a joint inversion using the multi-component induction tool measurements and measurement information from at least one other non-electromagnetic sensor to resolve a structural feature relating to at least one tubular of the plurality of nested conductive tubular.

Step 750 comprises conducting further operations in the formation in dependence upon the property. The further operations may comprise at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation. The conductive nested tubulars are substantially metallic.

Those versed in the art would recognize that the measurements made by the flux sensor would be affected by both the casing thickness and possible lateral inhomogeneities in the casing. In the context of borehole applications, the segments of casing string may be assumed to be magnetically homogenous at the manufacturing and installation stage, so that the absolute flux changes would be diagnostic of changes in casing thickness or casing perforations. Casing thickness variations could occur internally or externally to the casing. If, on the other hand, flux changes are observed in a section of casing known to be of uniform thickness, this would be an indication of changes in permeability of the casing caused possibly by heat or mechanical shock.

With measurements of two or more components of magnetic flux, it is possible to compensate for permeability changes and estimate the casing thickness. Such a method based on wavelet basis functions and which uses axial and radial flux measurements to determine the thickness of a pipeline has been discussed in S. Mandayam et al. Wavelet-based permeability compensation technique for characterizing magnetic flux leakage images, NDT&E International, vol. 30, No. 5, pp. 297-303, 1997, 7 FIGS. We summarize the method of Mandayam.

Given two signals $X_A$ and $X_B$ characterizing the same phenomenon, one can choose two distinct features $x_A(d, l, t)$ and $x_B(d, l, t)$ where t is an operational variable such as permeability, and d and l represent defect related parameters such as depth and length, $x_A(d, l, t)$ and $x_B(d, l, t)$ must be chosen so that they have dissimilar variations with t. In order to obtain a feature h that is a function of $x_A$ and $x_B$ and invariant with respect to the parameter t, one needs to obtain a function $f$ such that $$f\{x_A(d,l,t), x_B(d,l,t)\} = h(d,l) \tag{1}.$$

Given two functions $g_1$ and $g_2$, sufficient condition to obtain a signal invariant with respect to t, can be derived as $$h(d,l) \circ g_1(x_A) = g_2(x_B) \tag{2},$$

where ∘ refers to a homomorphic operator. Then the desired t-invariant response is defined as $$f(x_A, x_B) = g_2(x_B) \circ g_1^{-1}(x_A) \tag{3}.$$

The above procedure is implemented by proper choice of the functions h, $g_1$ and $g_2$.

In an example given by Mandayam, the radial and axial flux measurements are made. The defect related features are $P_z$, the peak-peak amplitude of the axial flux density and Pr, the peak to peak amplitude of the radial flux density, both of which are measures of the defect depth d; Dr the peak-peak separation of the radial flux density (which is related to the defect's axial length l); $D_c$, the circumferential extent of the axial flux density (which determines the defect width w). The permeability invariant feature is derived as:

$$h(d, l, w) = \frac{P_z(d, l, w, t)}{g_1\{P_r(d, l, w, t), P_z(d, l, w, t), D_r, D_c\}} \tag{4}$$

where t represents the permeability and $g_1$ is a geometric transformation function that maps the permeability variation of $P_t$ on to that of $P_z$. To get to eqn. (4), the function $g_2$ of eqn. (3) is assumed to be the identity function. Madayam assumes a suitable functional form for $g_1$ and determines its parameters using a neural net. The basic approach of Mandayam may be extended to three component measurements that are available with the apparatus of the present invention. As the sensor passes over an internal defect, the decrease in flux caused by the "missing" metal of the ID defect is detected, and serves to reveal the presence of an internal anomaly.

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Embodiments of the present disclosure may utilize an inversion of a multi-frequency or transient 3D electromagnetic sensor array casing survey data of multiple downhole casing liners and completion installation components. This inversion of this data may be carried out along with measurement information from other instruments, including nuclear, acoustic imaging, and EM flux data.

The particular model types employed may comprise a selection of available model types, and be constrained to a preliminary solution space estimation. For example, ground truth or other a priori data may be used to reduce the number of models to be evaluated, such as, for example, prior knowledge of the presence of particular characteristics of the volume in which the nested tubulars lie in the formation. If analysis from other data reveals that a particular model corresponds to a higher probability of finding correct properties (or tighter confidence limits), then a larger weight is may be assigned to its fitness function when interpreting measurement information. In this way if two models were shown to provide similar performance in reproducing tool response, then the model which was more promising based on prior studies may be selected.

Regularization may employ information from a database of multi-physics models and properties which may include data with respect to geology, mineralogy, electrical properties, nuclear properties, acoustic properties, NMR and reservoir production properties, including for example, well logs from various FE tools. This data may be obtained from downhole measurements, technical specifications, modeling and simulation, and so on. Regularization techniques may include simultaneous inversion, regularization algorithms, and regularization by conditioning.

A technique involves model regularization by conditioning, using geologic data, electric properties, and so on, and/or multi-instrument data. The data may be sequentially or simultaneously acquired and/or alternatively available in a searchable relational database with correlated and relevant data and analysis from the same volume (or a correlated volume). Instead of designating a particular value for a parameter, a probability density function (PDF) may be used to specify the probability of the parameter (e.g., a variable such as, for example, an observed measurement within a sample space) falling within a particular range of values or taking a value. The PDF may be derived from historical observation. The probability may be given by the integral of this variable's PDF over that range—that is, given by the area under the density function but above the horizontal axis and between the lowest and greatest values of the range. The PDF is non-negative everywhere, and its integral over the entire space may be equal to one. The PDFs may be used to accelerate inversion without excluding potential inversion outcomes that would satisfy forward models.

The PDF may be assigned based on previous observations with respect to the choice or preference of models, as well as value ranges for the models' respective parameters, as a function of location. These PDFs may be used to assign inversion weights to inversion parameters. The PDFs may employed for prioritizing and guiding inversion with weights on models and model parameter ranges reflecting most likely values for that particular volume. The PDFs may be tailored to an interval of the nested tubular based on a database of characteristics of previously characterized nested tubular (geometrical features, abnormalities, materials, etc.), or acquired by the tool during a logging operation (sequentially or concurrently acquired), such as, for example, acquired in the same trip. Inversion processing with a tool measurement and a corresponding forward model may similarly assign weights to the measurement signals being interpreted based on its signal-to-noise ratio. The better (higher) the signal to noise ratio, the higher the weight which may be assigned to the corresponding measurement data during inversion processing.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Estimated parameter values and/or models of the formation (or portions thereof) may be stored (recorded) as information or visually depicted on a display. The visual depiction may include a two-dimensional (2D) or three dimensional (3D) graphical depiction of values of the parameter of interest (although one-dimensional (1D) depictions may also be displayed in some applications). The values or model may be transmitted before or after storage or display, such as, for example, being transmitted uphole (i.e., to the surface or to modules closer to the surface). For example, information may be transmitted to other downhole components, or to the surface for storage, display, or further processing. Aspects of the present disclosure relate to modeling a volume of an earth formation using the estimated parameter values, such as, for example, by associating estimated parameter values with portions of the volume of interest to which they correspond, or by representing a boundary between areas of representative or statistically similar values along with the formation in a global coordinate system. Aspects include maintaining a model comprising a representation of the earth formation stored as information including a representation of parameter values with respect to location, either as absolute values or variances thereof. The model of the earth formation generated and maintained in aspects of the disclosure may be implemented as a representation of the earth formation, or volume of interest therein, stored as information, including a graphic representation of parameter values or variances in parameters of interest with respect to location, e.g., in 1D, 2D, or 3D. In one example, a model of the earth formation or a volume of interest may be maintained in a database. Modeling the earth formation may comprise associating a portion of the formation proximate the borehole with the parameter value as estimated herein, to generate or update the model. The information (e.g., data) may also be transmitted, stored on a non-transitory machine-readable medium, and/or rendered (e.g., visually depicted) on a display. Any of rendering the models, the values, or information representing the same may be referred to herein as "displaying the parameter of interest on a display."

Acoustic logs are records of the receipt, at successive borehole depth levels, of acoustic signals by receivers which are spaced along the length of a borehole tool from each other and from at least one transmitter of acoustic signals.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. Umbilical cabling as used herein refers to one or more umbilical cables and associated cables, conduits, inferior tubing, and/or hoses within the field, in a borehole, or from topsides to subsea. An umbilical cable may comprise a bundle of one or more cables and conduits that transfer hydraulic function, electric power, chemicals for injection or application, gas for artificial lift, and/or communication of information. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions. The term "geosteering" may refer to changing direction of the drill bit, stopping progression of the drill bit, or continuing advancement of the drill bit.

As used herein, the term "conductive" as applied to materials is defined as having a resistivity less than $10^{-4}$ ohm-meters (e.g., copper, silver, steel, etc.). "Reduced conductivity" materials may have a resistivity between $10^{-4}$ ohm-meters and $10^{-2}$ ohm-meters. In one particular embodiment, the material may be approximately 1000 times more resistive than steel. The term "non-conductive" as applied to materials is defined as having a resistivity above $10^{-4}$ ohm-meters (e.g., ferrite, insulating composites, polymers, plastics, and resins). The term "substantially non-conductive" comprises a range of conductivity including non-conductive and reduced conductivity materials.

Example reduced conductivity materials include composite materials, powdered metals, and so on. One specific type of composite materials includes carbon-reinforced composite materials. The resistivity and strength of carbon reinforced composite materials are typically linked to the amount of carbon fiber (or carbon tape) used in the composite. These materials have conductive carbon filaments embedded in their matrix material (e.g., resin), which makes them slightly conductive. Typically, both strength and conductivity will generally increase with the percentage of carbon fiber. The conductivity in such materials is highly anisotropic, however, with maximum conductivity being parallel to the carbon filaments, and minimum conductivity perpendicular to the filaments.

Alternative carbon fiber materials may employ designs where carbon filaments can be laid down in such a way that they are insulated from each other, resulting in tool bodies that are essentially non-conducting at low frequencies (e.g., 1 kHz), but reduced conductivity at higher frequencies (e.g., 10 MHz). Recently, materials incorporating meshes of glass fiber and carbon fiber have been developed.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

"Substantially different" as used herein means not substantially the same. "Substantially the same," or "substantially similar" as used herein means a value consistent with a general formation structure, feature, or operating parameter, or having a value within a common statistical deviation, such as within one standard deviation, within 5 percent, within 1 percent of a moving average and so on. Substantially the same refers to values within the generally held value for common deviation, such as, for example, due to noise. The term "substantially the same" as applied in the context of signal characteristic refers to frequencies negating the effects of dispersion and attenuation, such that differences in effects between two signals having corresponding signal characteristics are negligible, such as, for example, differences in lateral beam field of less than 25 percent, less than 10 percent, less than 5 percent, less than 3 percent, less than 2 percent, less than 1 percent, less than 0.5 percent, and so on, down to and including no difference.

The estimated parameter of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "substantially real-time" as applied to methods of the present disclosure refers to an action performed (e.g., estimation, modeling, and so on) while the sensor is still downhole, after the generation of the information and prior to movement of the sensor an appreciable distance within the context of evaluating the borehole or formation at an associated resolution, such as, for example, a distance of 100 meters, 50 meters, 25 meters, 10 meters, or less; and may be defined as estimation of the parameter of interest or production of the current iteration of a model within 15 minutes of generating the information, within 10 minutes of generation, within 5 minutes of generation, within 3 minutes of generation, within 2 minutes of generation, within 1 minute of generation, or less. The term "substantially continuous" as applied to measurement in accordance with embodiments of the present disclosure means that no gaps exist within the measurement corresponding to a circumference of the borehole at a particular borehole depth.

While the foregoing disclosure is directed to the one mode embodiments of the disclosure, various modifications will be apparent to those skilled in the art. It is intended that all variations be embraced by the foregoing disclosure.

What is claimed is:

1. A method of well logging, the method comprising:
taking multi-component induction tool measurements of a three-dimensional space from an interior of a plurality of nested tubulars in a borehole in an earth formation, comprising surveying the three-dimensional space in a plurality of magnetic tensor components, the multicomponent induction tool measurements responsive to a property corresponding to at least two conductive tubulars of the plurality of nested tubulars;
estimating the property for each of the at least two tubulars using the multi-component induction tool measurements;
magnetizing at least a portion of a first tubular of the plurality of tubulars to generate a spatially varying magnetic field having a magnetic field distribution responsive to abnormalities in the tubular; and
taking magnetostatic measurements responsive to the magnetic field distribution from a magnetic sensor array proximate an interior surface of the first tubular to generate magnetic measurement information, the magnetic sensor array comprising a plurality of magnetic sensors distributed in at least two dimensions over a face of a pad.

2. The method of claim 1 wherein taking multi-component induction tool measurements comprises:
taking low-frequency sinusoidal frequency domain waveform resistivity measurements;
taking transient electromagnetic (EM) measurements with the multi-component induction tool.

3. The method of claim 2 wherein the low-frequency sinusoidal frequency domain waveform resistivity measurements comprise three-dimensional low-frequency sinusoidal frequency domain waveform resistivity measurements, and the transient EM measurements comprise three-dimensional transient EM measurements.

4. The method of claim 2 wherein taking three-dimensional low-frequency sinusoidal frequency domain waveform resistivity measurements comprises using a multi-frequency measurement.

5. The method of claim 1 wherein at least one sensor of the magnetic sensor array comprises a three-dimensional magnetic sensor.

6. The method of claim 1 comprising:
using the multi-component induction tool measurements and the magnetic measurement information to resolve a structural feature relating to at least one tubular of the plurality of nested conductive tubulars exterior to the innermost tubular of the plurality of nested conductive tubulars.

7. The method of claim 6 wherein the structural feature comprises at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; viii) a material property of a material surrounding the at least one tubular.

8. The method of claim 6 comprising taking the magnetic measurements and the multi-component induction tool measurements at a plurality of decentralized positions with respect to at least one tubular of the plurality of nested conductive tubulars.

9. The method of claim 1, wherein the tubular is magnetically non-saturated, the method comprising:
characterizing regions of each tubular of the plurality as one of: linear non-saturated, partially saturated, and fully saturated;
using forward models incorporating a B-H transfer curve in an inversion process.

10. The method of claim 1 comprising:
performing a joint inversion using the multi-component induction tool measurements and the magnetic measurement information to resolve a structural feature relating to at least one tubular of the plurality of nested conductive tubulars exterior to the innermost tubular of the plurality of nested conductive tubular.

11. The method of claim 1 wherein magnetizing the first tubular saturates the tubular and a surrounding volume with a static field, and wherein taking multi-component induction tool measurements comprises superimposing at least one of i) three-dimensional low-frequency sinusoidal frequency domain waveform resistivity measurements, and ii) three-dimensional transient EM measurements, on the saturating static field to improve signal to noise ratio.

12. The method of claim 1 wherein the multi-component induction tool measurements are taken with a multi-component induction tool and wherein a substantially non-conductive housing of the multi-component induction tool separates a transmitter and receiver of the multi-component induction tool from the borehole.

13. The method of claim 1 wherein the multi-component induction tool measurements are taken with a multi-component induction tool and wherein the multi-component induction tool comprises an exterior housing, a substantially non-conductive chassis interior to the housing, and measurement circuitry mounted on the substantially non-conductive chassis such that the substantially non-conductive chassis electrically isolates the measurement circuitry from other components of the induction tool.

14. The method of claim 1 wherein the multi-component induction tool measurements are taken with a multi-component induction tool conveyed in the borehole by a carrier and wherein the carrier comprises at least one of i) a drill string; ii) coiled tubing; iii) a wireline; iv) slickline; and v) conveyed pipe.

15. The method of claim 1 comprising conducting further operations in the formation in dependence upon the property.

16. The method of claim 15 wherein the further operations comprise at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

17. The method of claim 1 wherein taking transient electromagnetic (EM) measurements with the multi-component induction tool comprises:
generating an electromagnetic (EM) field using an EM transmitter of the multi-component induction tool to produce interactions between the electromagnetic field and the plurality of nested conductive tubulars;
obtaining EM measurements indicative of the interactions; and
wherein estimating the property for each of the at least two tubulars comprises:
performing an inversion of the EM measurements using a forward model generated with the property corresponding to each conductive tubular.

18. The method of claim 1 comprising performing a joint inversion using the multi-component induction tool measurements and measurement information from at least one other non-electromagnetic sensor to resolve a structural feature relating to at least one tubular of the plurality of nested conductive tubulars.

19. The method of claim 1 wherein the property comprises at least one of: i) thickness of the tubular; and ii) at least one property of a defect of the tubular.

20. The method of claim 1 wherein one or more tubulars of the plurality of nested tubulars comprises well casing.

* * * * *